Patented Sept. 25, 1945

2,385,532

UNITED STATES PATENT OFFICE 2,385,532

OIL CONTAINER

La Verne E. Cheyney, Akron, and Harold Judson Osterhof, Cuyahoga Falls, Ohio, assignors to Wingfoot Corporation, Akron, Ohio, a corporation of Delaware No Drawing. Original application October 4, 1941, Serial No. 413,655. Divided and this application July 1, 1943, Serial No. 493,109

2 Claims. (Cl. 206—46)

This invention relates to an oil container made from rubber hydrochloride film plasticized with diethoxyethoxyethyl succinate. It includes the plasticized rubber hydrochloride film.

The oil container of this invention may be constructed in any suitable way. It may be a stiff container lined with the plasticized material, such as a cylindrical cardboard carton with metal ends. On the other hand, it may be a bag made of the plasticized rubber hydrochloride film. Any suitable bag structure may be used, such as, for example, a bag formed by folding a single sheet of the film and uniting the two sides adjacent the fold to make a bag open on one side. This bag may be squared up by placing it over a mandrel, and then, after filling, it may be sealed by drawing the open side flat and sealing the two surfaces of the film at the mouth.

Diethoxyethoxyethyl succinate is oil insoluble and water insoluble. Rubber hydrochloride plasticized with this material may be used in the form of a lacquer for coating the interior of a container, or it may be used as a film not more than .002 inch thick from which a bag may be formed. The bag may be enclosed in a suitable carton. Rubber hydrochloride film plasticized with diethoxyethoxyethyl succinate has higher impact strength than the unplasticized film.

Although for greatest strength the plasticizer should be used in an amount at least as great as 20 or 30 per cent by weight of the rubber hydrochloride, it is to be understood that smaller amounts may be used where desirable. Rubber hydrochloride plasticized with 30 per cent by weight of the plasticizer, when made into a bag sealed without reentrant folds, is satisfactory for paraffin-base lubricating oils. In general, the plasticized film is also suitable for use with napthenic-base lubricating oils.

This application is a division of our application Serial No. 413,655, filed October 4, 1941.

What we claim is:

1. Rubber hydrochloride film of high impact strength plasticized with about 30 per cent diethoxyethoxyethyl succinate.

2. A bag containing lubricating oil, the walls of which are composed of a film of rubber hydrochloride of high impact strength which is plasticized with about 30 per cent diethoxyethoxyethyl succinate.

LA VERNE E. CHEYNEY.
HAROLD JUDSON OSTERHOF.